United States Patent [19]
Satoda et al.

[11] Patent Number: 5,758,978
[45] Date of Patent: Jun. 2, 1998

[54] THRUST BALL BEARING

[75] Inventors: Masahiko Satoda; Masatoshi Niina, both of Kuwana; Yukimitsu Yamamoto, Yokkaichi, all of Japan

[73] Assignee: NTN Corporation, Osaka, Japan

[21] Appl. No.: 834,505

[22] Filed: Apr. 4, 1997

[30] Foreign Application Priority Data

| Apr. 5, 1996 | [JP] | Japan | 8-084253 |
| Apr. 5, 1996 | [JP] | Japan | 8-084256 |
| Aug. 29, 1996 | [JP] | Japan | 8-228639 |

[51] Int. Cl.⁶ .................. F16C 19/10; F01C 1/02; F16H 37/00
[52] U.S. Cl. .................. 384/609; 74/86; 418/55.3
[58] Field of Search .................. 384/590, 604, 384/608, 609, 615, 617; 74/86; 418/55.1, 55.3

[56] References Cited

U.S. PATENT DOCUMENTS

| 4,259,043 | 3/1981 | Hidden et al. | 384/609 X |
| 4,474,543 | 10/1984 | Hiraga et al. | 418/55.3 |
| 4,565,457 | 1/1986 | Flander | 384/615 X |
| 4,645,435 | 2/1987 | Sugimoto | 418/55.3 |
| 4,715,733 | 12/1987 | Rood | 384/445 |

FOREIGN PATENT DOCUMENTS

| 33811 | 2/1993 | Japan | 384/615 |
| 126140 | 5/1993 | Japan | 384/609 |

Primary Examiner—Thomas R. Hannon
Attorney, Agent, or Firm—Nikaido, Marmelstein, Murray & Oram LLP

[57] ABSTRACT

The inner circumference 4a2 of the bearing ring 4a is square-shaped, and the outer circumference 4a3 thereof is circular. The shoulder 1a1 of the attaching portion 1a of the scroll member 1 is formed to be square-shaped, corresponding to the inner circumference 4a2 of the bearing ring 4a. When attaching the bearing ring 4a to the attaching portion 1a, the square-shaped inner circumference 4a2 of the bearing ring 4a is fitted to the square-shaped shoulder 1a1 of the attaching portion 1a. Thus, by fitting the inner circumference 4a2 of the bearing ring 4a to the shoulder 1a1 of the attaching portion 1a, the bearing ring 4a is prevented from rotating with respect to the swivel scroll member 1.

8 Claims, 8 Drawing Sheets

1

THRUST BALL BEARING

FIELD OF THE INVENTION

The present invention relates to a thrust ball bearing disposed between two members carrying out eccentric rotating movements therebetween, such as a swivel scroll member and a stationary scroll member in a scroll compressor.

BACKGROUND OF THE INVENTION

For example, a scroll compressor is provided with spiral partitions 11b,12b on each of a swivel scroll member 11 and a stationary scroll member 12 as shown in FIG. 14. The inner capacity of the compression chamber P formed between the spiral partitions 11b and 12b is varied in line with the eccentric rotations of the swivel scroll member 11 with respect to the stationary scroll member 12, whereby the compressing movement of a fluid in the compression chamber P is performed.

The axial center of the swivel scroll member 11 is made eccentric an eccentricity amount e from the axial center of a drive motor 15, wherein as the output shaft 15a of the drive motor 15 rotates, the swivel scroll member 11 eccentrically rotates at a swivel radius equivalent to the eccentricity amount e. At this time, such a force that causes the swivel scroll member 11 to rotate acts on the swivel scroll member 11, and a thrust load accompanied by compression movements of fluid is loaded thereto. Therefore, in order to prevent the turning of the swivel scroll member 11 to support the thrust load, a thrust ball bearing 14 is disposed between the swivel scroll member 11 and stationary scroll member 12 (in the construction shown in FIG. 14, between the swivel scroll member 11 and the stationary frame 13 fixed at the stationary scroll member 12).

As shown in enlargement in FIG. 15, the thrust ball bearing is comprised, for example, a pair of bearing rings 14a,14b having the same shape and sate dimension, a plurality of balls 14c disposed between the bearing rings 14a and 14b. The bearing rings 14a,14b are fixed to attaching portions 11a,13a opposite to each other in the axial direction of the swivel scroll member 11 and stationary scroll member 13.

As shown in FIG. 16, the bearing ring 14a (14b) is a ring, the inner circumference 14a2 (14b2) and outer circumference 14a3 (14b3) thereof are of circular-shaped. At one end surface thereof, a plurality of raceway surfaces 14a1 (14b1) are formed on the same circumference. Each of the raceway surfaces 14a1 (14b1) is of annular-shaped, the cross-section thereof is arcuate-shaped. The balls 14c disposed on the respective raceway surfaces 14a1(14b1) roll on the pitch circle PCD of the raceway surfaces 14a1 (14b1) in line with eccentric rotations of the swivel scroll member 11. The diameter d of the pitch circle PCD of the raceway surface 14a1 (or 14b1) is equal to the eccentricity amount e.

At the bearing ring 14a (14b) of the shape as described above, the inner circumference 14a2 (14b2) or outer circumference 14a3 (14b3) is fitted to the shoulder of the corresponding attaching portion 11a (13a) with a circular-fitting, or both the inner circumference 14a2 (14b2) and outer circumference 14a3 (14b3) are fitted to the shoulder of the corresponding attaching portion 11a (13a) with circular-fittings, and furthermore they are respectively fixed to the corresponding attaching portion 11a(13a) with, for example, a turn stopping means such as pin engagement, projection/recess engagement, and caulking, etc. A reason why such a turn stopping means is required is that a force is produced, which causes the bearing ring 14a (14b) to rotate with respect to the attaching portion 11a (13a) in line with the eccentric rotations of the swivel scroll member 11.

In the conventional thrust ball bearing 14, the pair of bearing rings 14a,14b are of the same shape and sate dimensions, and the groove curvatures of the raceway surfaces 14a1,14b1 are of the same The reason why the curvatures is given to the raceway surfaces 14a1, 14b1 is to decrease the contact pressures with the balls 14c to increase the service life thereof.

However, since there are cases where a slippage arises in the mutual positional relationship between the bearing rings 14a,14b due to the mounting errors, etc., a function which can absorb such a positional slippage is requisite.

Furthermore, since it is necessary to perform pin holes, notches, caulkings, etc., in order to specially provide such a turn stopping means as described above, there are many cases where it is difficult to secure space therefor due to the dimensional restrictions. If such space is attempted to be secured under the dimensional restrictions, it is necessary to decrease the ball diameter or to reduce the number of raceway surfaces. Therefore, the functions of the bearing may be sacrificed. Still further, such a problem arises, where the assembling work may be made complicated.

SUMMARY OF THE INVENTION

It is therefore a first object of the invention to provide a construction which can absorb the slippage in the mutual positional relationship between the bearing rings, taking into consideration the basic requirements such as reducing of the contact pressure and securing of the functions as a bearing. With the invention, one of the groove curvatures of the mutually opposite raceway surfaces of the bearing rings is different from the other. More concretely, such a construction may be employer, where the groove curvature of the raceway surface of one bearing ring is larger than the groove curvature of the raceway surface of the other bearing ring, or the pair of bearing rings are of the same shape respectively having raceway surface of larger groove curvature and raceway surface of smaller groove curvature, one of the groove curvatures of the mutually opposite raceway surfaces is different from the other by a difference of position between the bearing rings in the circumferential direction.

By making the groove curvature of the raceway surface of one bearing ring larger than the groove curvature of the raceway surface of the other bearing ring, the positional slippage between the bearing rings can be absorbed by the bearing ring having the raceway surface of larger groove curvature, and adequate rolling movement of the balls can be accomplished by the bearing ring having the raceway surface of smaller groove curvature. Furthermore, the bearing rings of the sane shape respectively provided with raceway surface of larger groove curvature and raceway surface of smaller groove curvature in an appointed pattern are used as a pair, and the pair of bearing rings are opposed to each other with the difference of position therebetween in the circumferential direction, whereby the abovementioned effect which can be achieved by two kinds of bearing rings having difference groove curvatures of the raceway surfaces from each other can be achieved by only one kind of bearing. Therefore, it is possible to decrease the production cost.

It is a second object of the invention to solve the abovementioned problems by doing away with the turn stopping means for the bearing rings in the conventional construction. In order to achieve this object, with the invention, the inner circumference or the outer circumference of at least one of the bearing rings is made non-circular, or both are made non-circular. The bearing ring made non-circular is fitted to corresponding attaching portion of a member with a non-circular fitting. The language "non-circular" means and includes all the shapes other than a circular-shaped such as elliptical, two-spherical, tooth-shaped, etc. in addition to multi-polygon such as triangle, square, hexagon, etc., and the language "non-circular fitting" means that an inner circumference and an outer circumference of two element having each kind of shapes described above are adapted in shape to each other and are fitted to each other. According to this construction, since there is no need to specially employ pin engagement, projection/recess engagement, caulking, etc., any of which is requisite in the conventional construction, the construction according to the invention is easily applied to even a case where the dimensional restriction is severe, and there is no worry about a lowering of the function as a bearing. Still furthermore, since it is not necessary for specially employ any of the turn stopping means, it is possible to reduce the dimensions of a bearing, and the assembling work say be simplified.

DESCRIPTION OF PREFERRED EMBODIMENTS

Hereinafter, a description is given of a preferred embodiment in which the present invention is applied to a thrust ball bearing for a scroll compressor.

Figure 1:
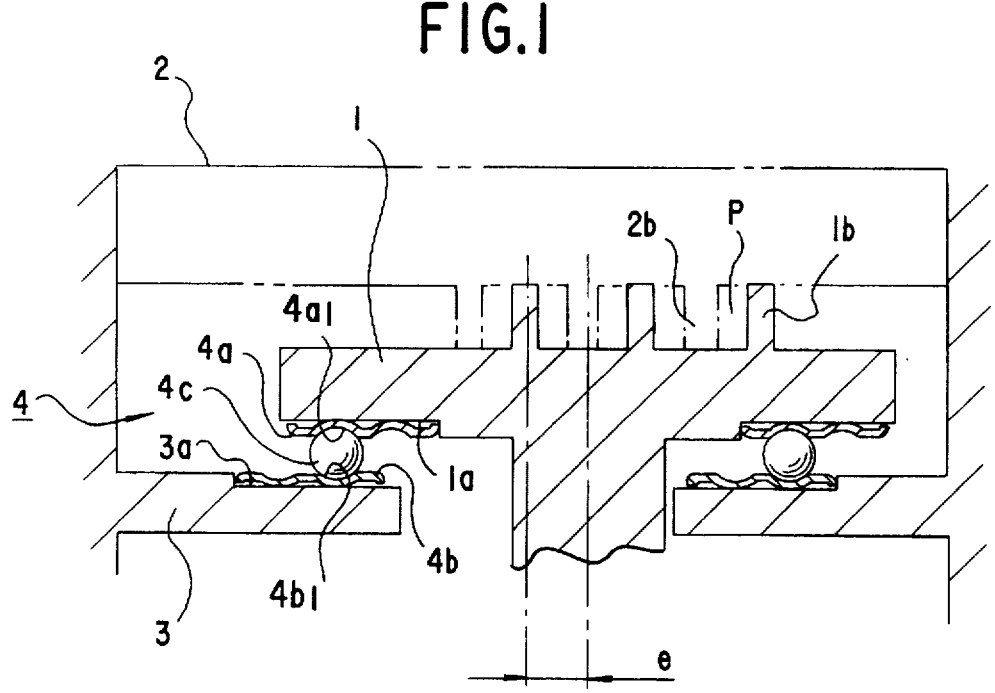
FIG. 1 is a cross-sectional view showing the surrounding parts of a thrust ball bearing in a scroll compressor.
Figure 14:
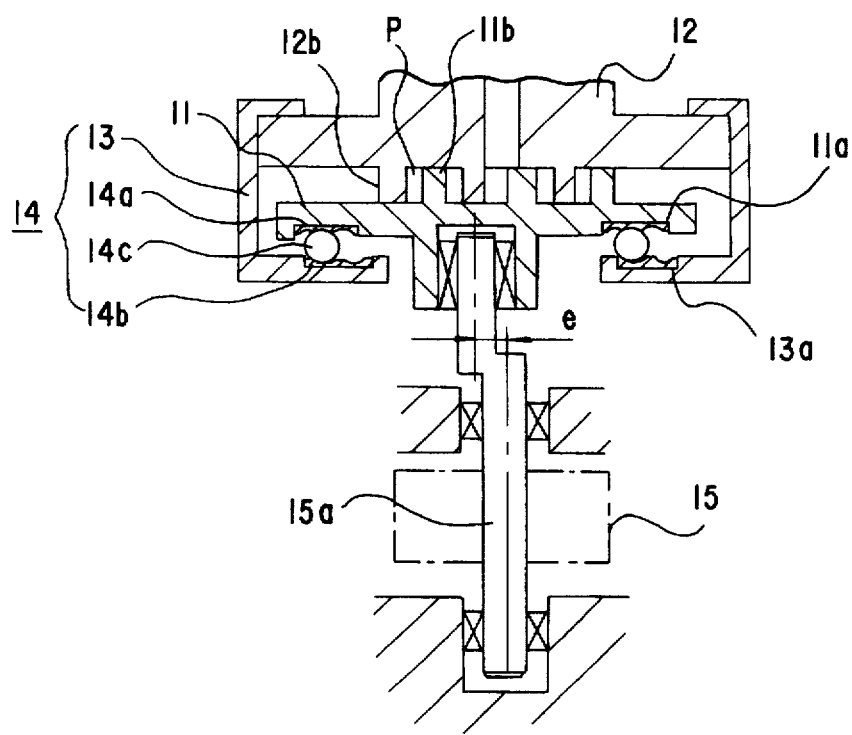
FIG. 14 is a cross-sectional view showing a general construction of a scroll compressor.

FIG. 1 shows the surrounding parts of a thrust ball bearing 4 in such a scroll compressor as shown in FIG. 14 A pair of bearing rings 4a,4b of the thrust ball bearing 4 are respectively fixed to attaching portions 1a,3a opposed to each other in the axial direction of a swivel scroll member 1 and a stationary frame 3 (a stationary frame 3 is fixed to the stationary scroll member 2), and balls 4c are disposed between a plurality of raceway surfaces 4a1,4b1 formed on the bearing rings 4a,4b. By the swivel scroll member 1 eccentrically rotating at a swivel radius equal to the eccentricity amount e with respect to the stationary scroll member 2, the compression chamber P formed between spiral partitions 1b,2b thereof varies in its volumetric capacity to cause a compression movement of fluid to be commenced. The thrust ball bearing 4 performs the functions to prevent self rotations of the swivel scroll members 1 and to support the thrust load when such a compression movement carrying out.

Figure 2:
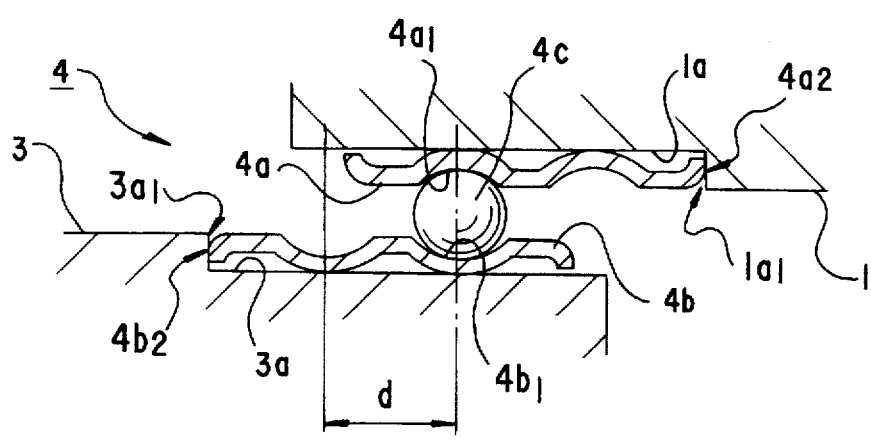
FIG. 2 is an enlarged cross-sectional view showing the vicinity of the thrust ball bearing shown in FIG. 1.

As shown in enlargement in FIG. 2, in this embodiment, the attaching portions 1a,3a a are respectively step-like. The inner circumference 4a2 of the bearing ring 4a at the swivel side is fitted to the shoulder 1a1 of the attaching portion 1a, and the outer circumference 4b2 of the bearing ring 4b at the stationary side is fitted to the shoulder 3a of the attaching portion 3a.

Figure 3:
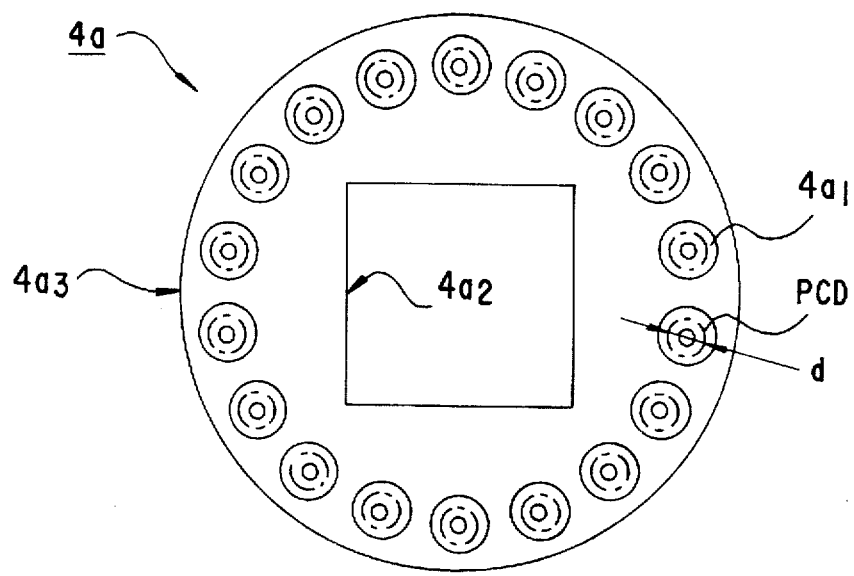
FIG. 3 is a plan view showing the bearing ring at the swivel side.

FIG. 3 shows the bearing ring 4a at the scroll side. The bearing ring 4a is formed of, for example, steel plate material, by a press work, and a plurality of recessed raceway surfaces 4a1 are formed on the same circumference at one end surface thereof. Each of the raceway surfaces 4a1 is of annular-shape, and ball 4c disposed in each of the raceway surfaces 4a1 is caused to roll on the pitch circle PCD of the raceway surfaces 4a1 in line with the eccentric rotations of the swivel scroll member 1. The diameter d of the pitch circle PCD of the raceway surfaces 4a1 is equal to the eccentricity amount e. The inner circumference 4a2 of the bearing ring 4a is of non-circular-shaped, for example, square-shaped while the outer circumference 4a3 thereof is of circular-shaped.

Figure 4:
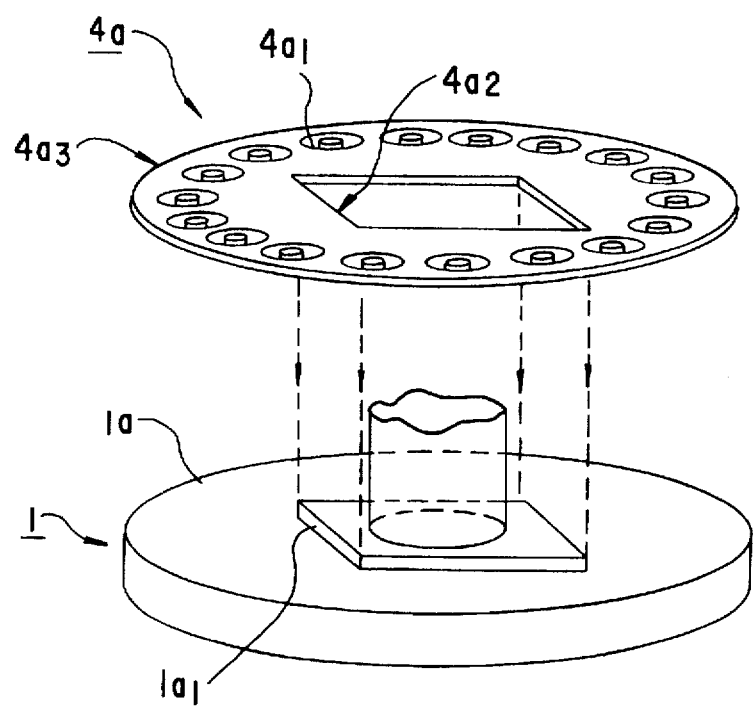
FIG. 4 is a perspective view showing the mounted state of the bearing ring at the swivel side.

Furthermore, as shown in FIG. 4, the shoulder 1a1 of the attaching portion 1a of the scroll member 1 is formed to be non-circular, for example, square-shaped, corresponding to the inner circumference 4a2 of the bearing ring 4a. When attaching the bearing ring 4a to the attaching portion 1a, the square-shaped inner circumference 4a2 of the bearing ring 4a is fitted to the square-shaped shoulder 1a1 of the attaching portion 1a. Thus, by the non-circular fitting of the inner circumference 4a2 of the bearing ring 4a to the shoulder 1a1 of the attaching portion 1a, the bearing ring 4a can be prevented from rotating with respect to the swivel scroll member 1. Therefore, it is not necessary to provide with specially turn stopping weans although required in the abovementioned conventional art.

Figure 5:
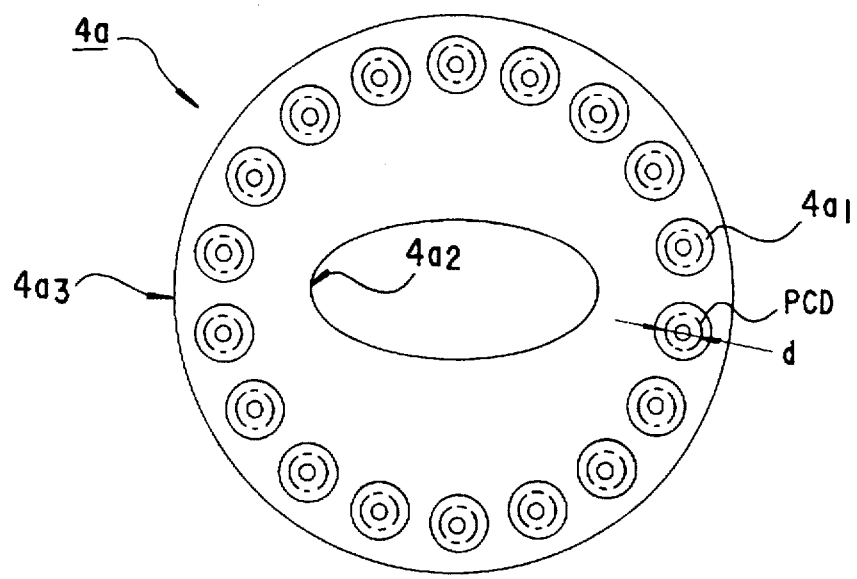
FIG. 5 through FIG. 7 respectively show a plan view showing a bearing ring in a modified example.

In a modification shown in FIG. 5, the inner circumference 4a2 of the bearing ring 4a at the scroll side is made elliptical. The shoulder 1a1 of the attaching portion 1a of the swivel scroll member 1 is formed to be elliptical, whereby both of then are fitted to each other with a non-circular fitting.

Figure 6:
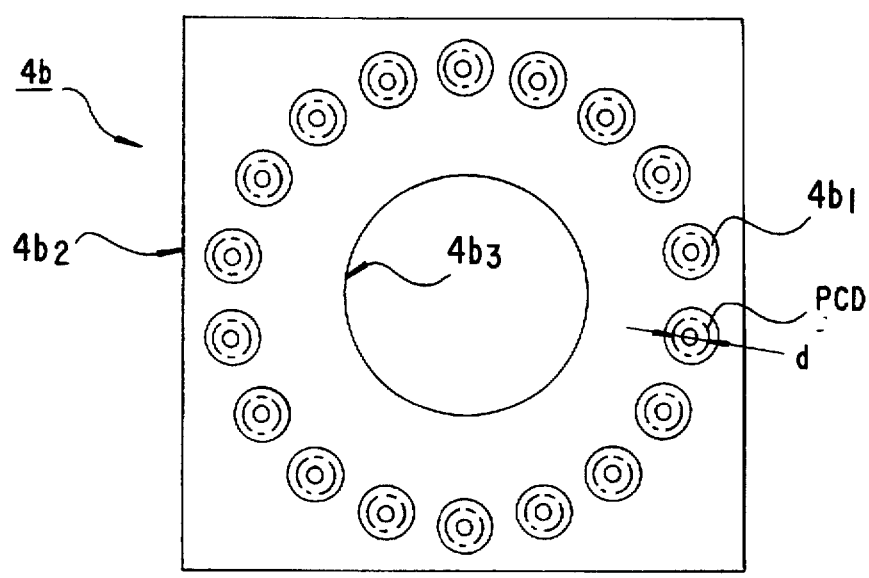

FIG. 6 shows a bearing ring 4b at the stationary side. The bearing ring 4b is formed of, for example, steel plate material, by a press work, and a plurality of recessed raceway surfaces 4b1 are formed on the same circumference at one end thereof in the same phase as that of the raceway surfaces 4a1 of the bearing ring 4a at the swivel side. Each of the raceway surfaces 4b1 is of annular-shaped, and a ball 4c disposed in each of the raceway surfaces 4b1 is caused to roll on the pitch circle PCD of the raceway surface 4b1 in line with the eccentric rotations of the swivel scroll member 1. The diameter d of the pitch circle PCD of the raceway surface 4b1 is equal to the eccentricity amount e. The outer circumference of the bearing ring 4b is made non-circular, for example, square-shaped while the inner circumference 4b3 thereof is made circular. Furthermore, although the illustration is omitted, the shoulder 3a1 of the attaching portion 3a of the stationary frame 3 is made non-circular, for example, square-shaped, corresponding to the outer circumference 4b2 of the bearing ring 4b. When attaching the bearing ring 4b to the attaching portion 3a, the square-shaped outer circumference 4b2 of the bearing ring 4b is fitted to the square-shaped shoulder 3a1 of the attaching portion 3a. Thus, by the non-circular fitting of the inner circumference 4b2 of the bearing ring 4b to the shoulder 3a1 of the attaching portion 3a, the bearing ring 4b can be prevented from rotating with respect to the stationary frame 3 (and stationary scroll member 2). Therefore, it is not necessary for any turn stopping means to be provided as in the conventional arts.

Figure 7:
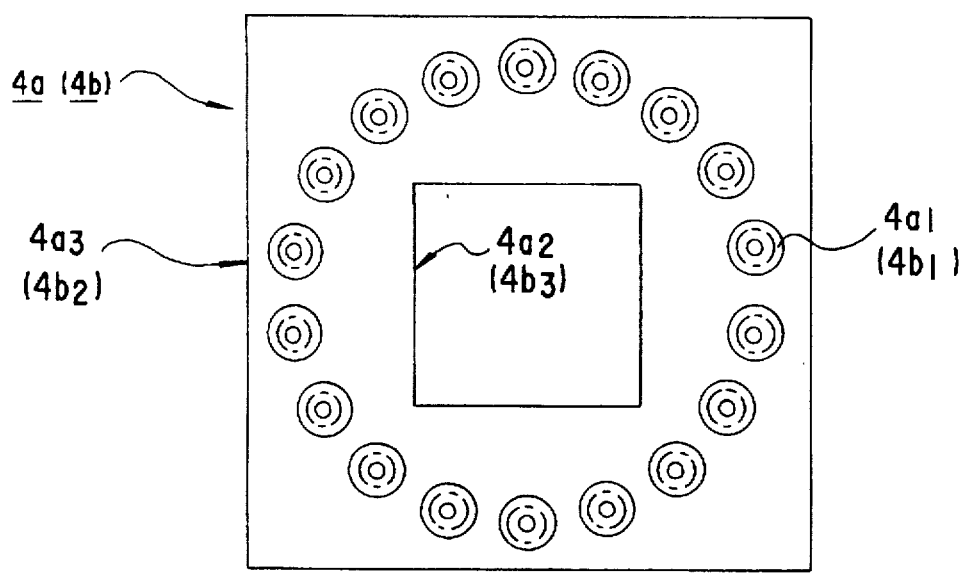

In the modification shown in FIG. 7, the inner circumference 4a2 (4b3) and outer circumference 4a3(4b2) of the bearing ring 4a (or/and the bearing ring 4b) are made non-circular, for example, square-shaped. The inner circumference 4a2 of the bearing ring 4a (the outer circumference 4b2 of the bearing ring 4b) is fitted to the shoulder 1a1 (the shoulder 3b1 of the attaching portion 3a of the stationary frame 3) of the attaching portion 1a of the swivel scroll member 1 with the non-circular fitting as in the abovementioned. Since the bearing ring 4a at the swivel side is formed to have the same shape as that of the bearing ring 4b of the stationary side, it is possible to simplify the production process, assembling process, and parts control.

A turn stopping means in the non-circular fitting as described above may be provided at at least one of the bearing ring 4a at the swivel side and the bearing ring 4b at the stationary side. Furthermore, such a non-circular fitting is not limited to only the square-shaped fitting and the elliptically-shaped fitting described above. Various kinds of non-circular fitting structures, for example, triangular-shaped fitting, hexagon-shaped fitting, etc., may be employed. Furthermore, the attaching portions nay not be step-like. That is, in a case where the attaching portions may be made annular-groove-shaped (that is, to have shoulders at the inner and outer circumferential surfaces), both of the inner and outer circumferential surfaces of the bearing rings may be fitted to the respective shoulders of the annular-groove-shaped attaching portions with non-circular fittings. Still furthermore, the attaching portion at the stationary side may be formed at the stationary scroll member.

Hereupon, since, in this kind of thrust ball bearing, there are cases where a slippage may arise in the mutual positional relationship between the pair of bearing rings due to the attaching errors or the like, it is necessary to have a function capable of absorbing such a positional slippage. Embodiments described below propose such constructions that can absorb such a positional slippage.

Figure 8:
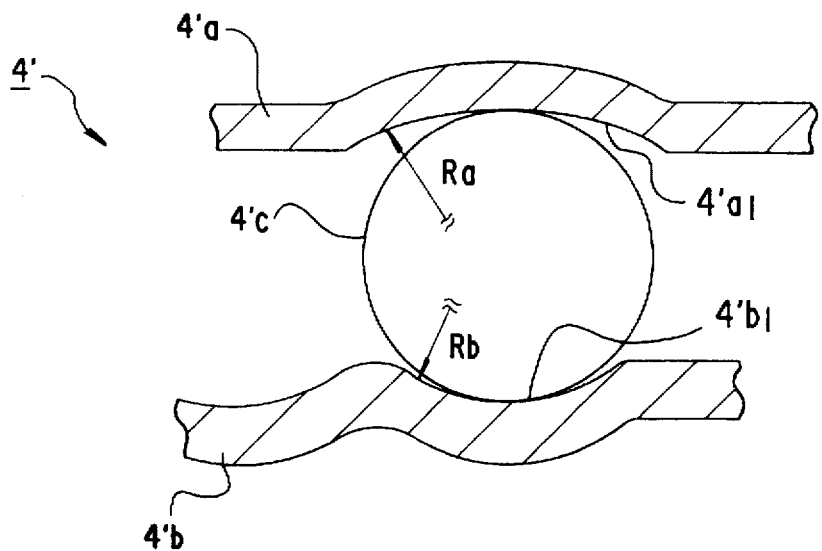
FIG. 8 and FIG. 9 are an enlarged cross-sectional view showing the surrounding parts of the raceway surface of a thrust ball bearing according to another preferred embodiment.

Embodiment shown in FIG. 8, the groove curvature (radius of curvature) Ra of the raceway surface 4'a1 of one-bearing ring, for example, the swivel side bearing ring 4'a, is larger than the groove curvature (radius of curvature) Rb of the raceway surface 4'b1 of the other bearing ring, for example, the stationary side bearing ring 4'b. That is, (Ra>Rb). Furthermore, the inequality of the groove curvature may be (Ra<Rb).

Figure 9:
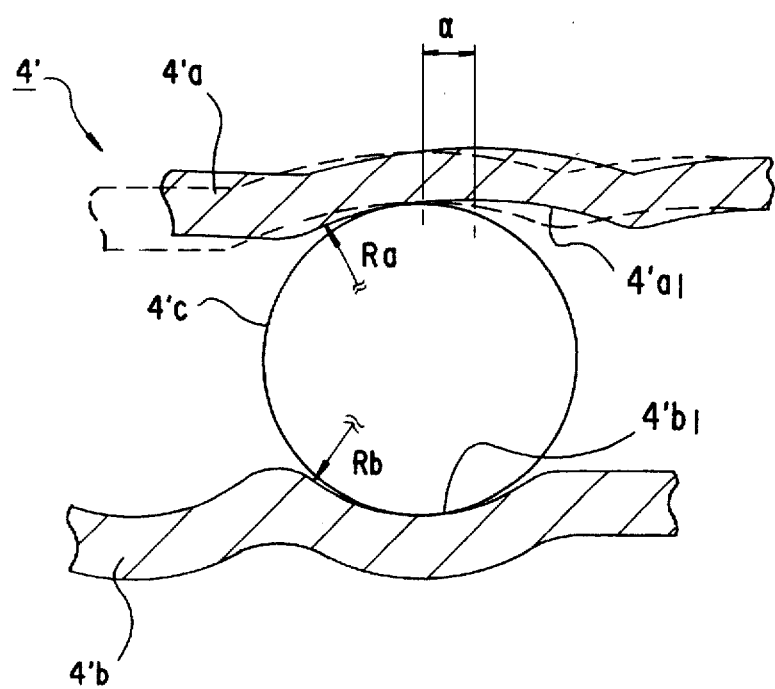

As shown in FIG. 9, in a case where a positional slippage α arises between the bearing ring 4'a at the swivel side and the bearing ring 4'b at the stationary side, the slippage can be absorbed by the bearing ring 4'a having a larger groove curvature of the raceway surface 4'a1. The diameter of the pitch circle PCD of the raceway surface 4'b1 is equal to the eccentricity amount e.

Figure 10:
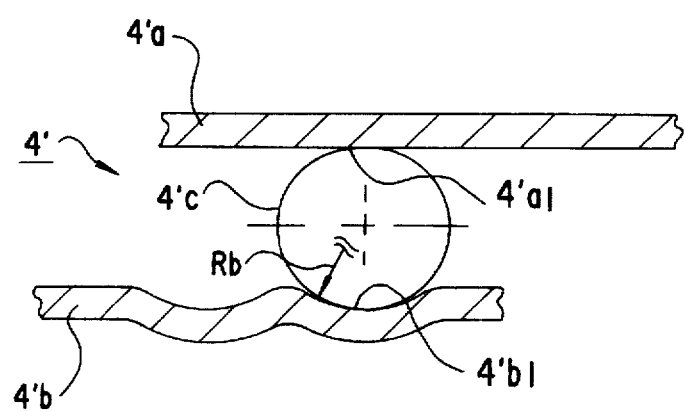
FIG. 10 is an enlarged cross-sectional view showing the surrounding parts of the raceway surface of a thrust ball bearing according to a modified example.

As shown in FIG. 10, the groove curvature of the raceway surface 4'a1 of one bearing ring, for example, the swivel side bearing ring 4'a may be made infinite to make flat.

Embodiments shown in FIG. 8 through FIG. 10 are formed of steel plate material by press work, using different dies for each of one bearing ring 4'a and the other bearing ring 4'b. However, it may be constructed that the same bearing rings are used for both the swivel side and stationary side.

Figure 11:
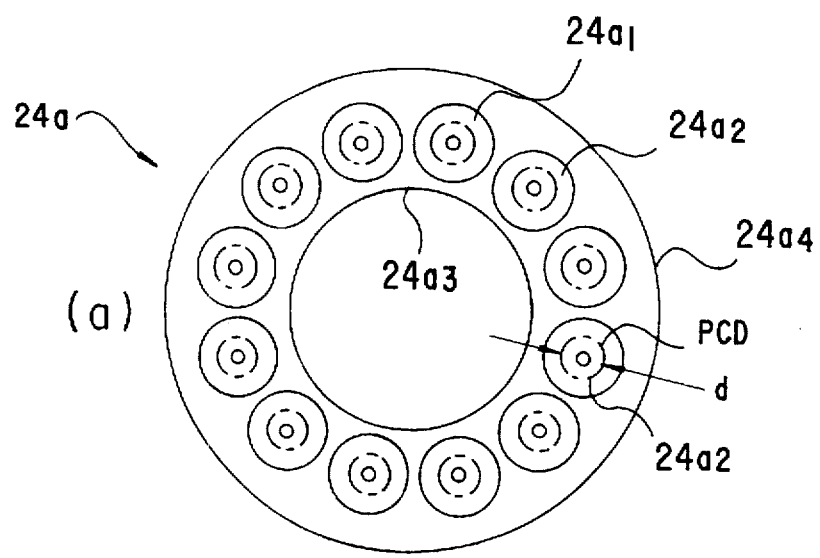
FIG. 11 through FIG. 13 are a plan view showing the raceway surface according to another codified example.
Figure 15:
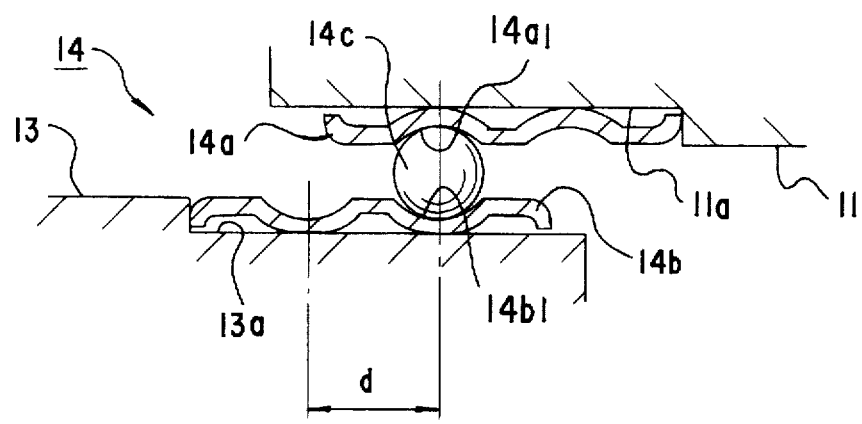
FIG. 15 is an enlarged cross-sectional view showing the surrounding parts of the raceway surface of a thrust ball bearing according to a conventional construction.
Figure 16:
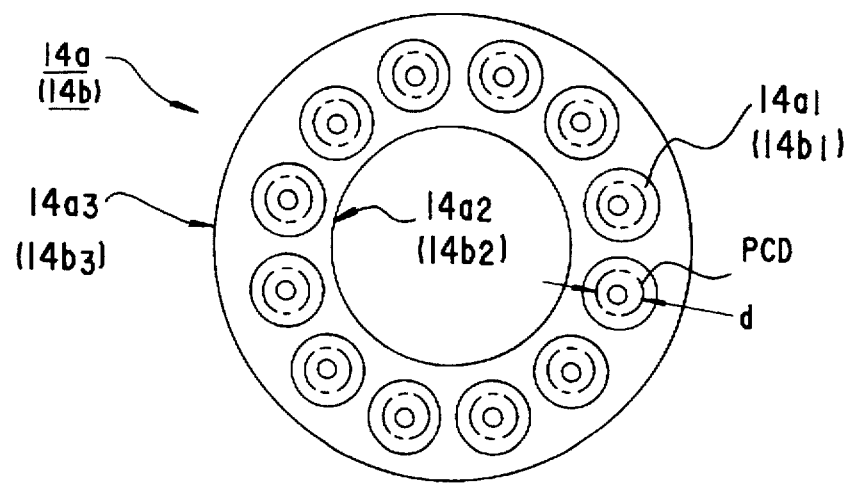
FIG. 16 is a plan view showing the raceway surface according to the conventional construction.

For example, as shown in FIG. 11, raceway surfaces 24a1 having larger groove curvatures and raceway surfaces 24a2 having smaller groove curvatures are alternately formed on the same circumference of one bearing ring 24a. These may be used as a pairs in this case, a pair of the bearing rings 24a shift to each other equivalent to one raceway surface 24a1 (24a2) in the circumferential direction to oppose each other, the inner circumference 24a3 of the swivel side bearing ring 24a is fixed at the attaching portion 11a as shown in FIG. 15, and the outer circumference 24a 4 of the stationary side bearing ring 24 is fixed to the attaching portion 13a. Thereby, the raceway surface 24a1 having a larger groove curvature and the raceway surface 24a2 having a smaller groove curvature are in mutually opposed state at each phase in the circumferential direction. The groove curvature of the raceway surface 24a1 of the bearing ring 24a is made the same as the groove curvature Ra of the raceway surface 4'a1 described above, and the groove curvature of the raceway surface 24a2 is made the same as the groove curvature Rb of the raceway surface 4'b1 described above {That is, (Ra>Rb)}. Furthermore, the diameter of the pitch circle PCD of the raceway surfaces 24a2 is equal to the eccentricity amount e shown in FIG. 14 (FIG. 1). However, for the convenience of explanation, In FIG. 11, the raceway surfaces 24a1 are illustrated in exaggeration to be larger than the raceway surfaces 24a2.

By devising the array of the raceway surfaces 24a1, 24a2 in a pair of the bearing rings 24a,24a, it is possible to securely absorb the positional slippage between the bearing rings due to attaching errors or the like as in the embodiments where two kinds of bearing rings (having different shapes) are used, utilizing one kind of the bearing rings 24a,24a having the same shape. Furthermore, by using the bearing rings of the same shape as a pair, the number of components may be decreased in comparison with a case of using bearing rings of different shapes at the swivel side and the stationary side, thereby the production cost can be decreased to a large extent.

Figure 12:
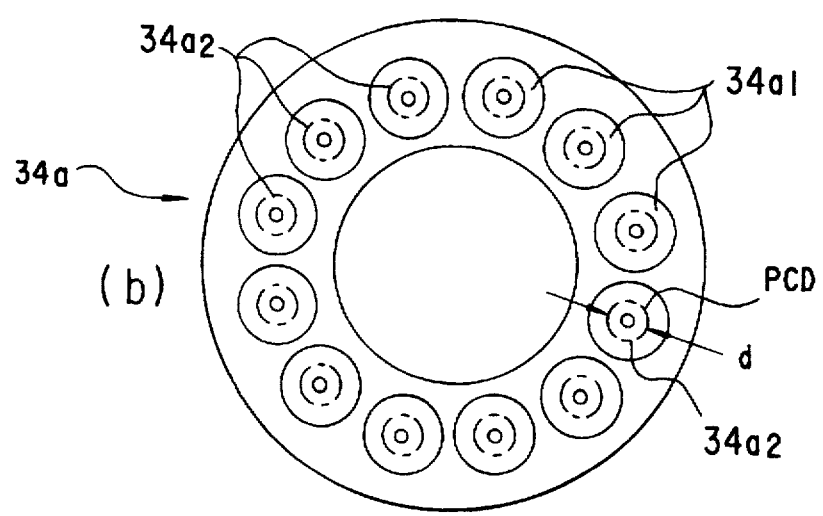

In a modification shown in FIG. 12, raceway surfaces 34a1 having larger groove curvatures and the raceway surfaces 34a2 having smaller groove curvatures are alternately formed three by three on the same circumference of one bearing ring 34a. The bearing ring 34a according to this modification have the same effects and functions as those of the bearing ring 24a.

Figure 13:
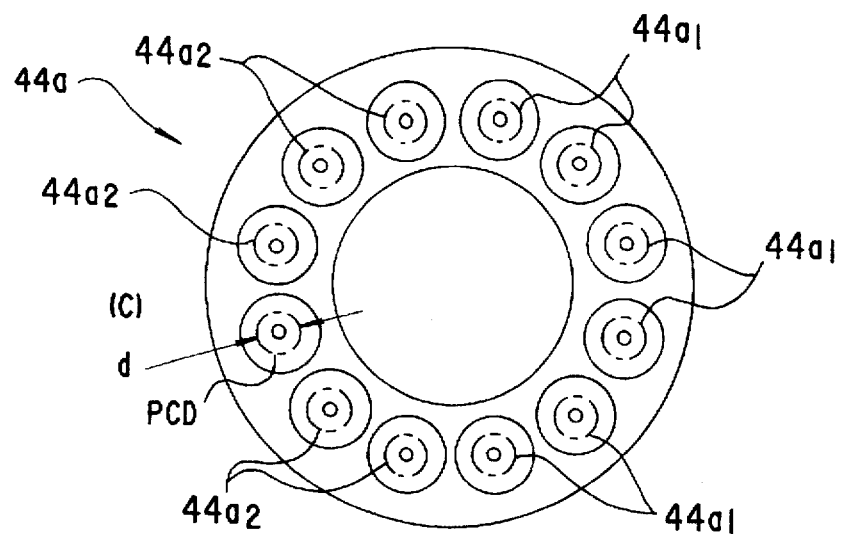

In a modification shown in FIG. 13, the raceway surfaces 44a1 having larger groove curvatures and the raceway surfaces 44a2 having smaller groove curvatures are respectively formed on the same circumference of one bearing ring 44a in such a manner where all the raceway surfaces 44a1 are located at one side while all the raceway surfaces 44a2 are located at the other side. The bearing ring 44a according to this modification have the same effects and functions as those of the bearing ring 24a.

In FIG. 11 through FIG. 13, although both the inner circumference and the outer circumference of the bearing ring are of circular-shaped, the inner circumference or the outer circumference of at least one bearing ring, or both of them &ay be of non-circular-shaped, and they may be fitted to the corresponding attaching portions of the members, in compliance with the embodiments shown in FIG. 3 through FIG. 7.

The invention is applicable to not only a thrust ball bearing for a scroll compressor but also thrust ball bearings disposed between two members which carry out eccentric rotating movements therebetween, and which support thrust loads, generally.

What is claimed is:

1. A thrust ball bearing comprising:

a pair of bearing rings positioned opposite to each other in the axial direction, the bearing rings carrying out eccentric rotating movements therebetween;

raceway surfaces formed on axially mutually opposite surfaces of the bearing rings;

and balls disposed between the mutually opposite raceway surfaces of the bearing rings, wherein one of the groove curvatures of the mutually opposite raceway surfaces is different from the other.

2. A thrust ball bearing as set forth in claim 1, wherein the groove curvature of one bearing ring is larger than the groove curvature of the other bearing ring.

3. A thrust ball bearing as set forth in claim 1, wherein the pair of bearing rings are of the same shape, said each bearing ring having raceway surface of larger groove curvature and raceway surface of smaller groove curvature, and wherein one of the groove curvatures of the mutually opposite raceway surfaces is different from the other by a difference of position between the bearing rings in the circumferential direction.

4. A thrust ball bearing as set forth in claim 1, 2 or 3, wherein an inner circumference or an outer circumference of at least one of said bearing rings is shaped non-circular, or an inner circumference and an outer circumference of at least one of said bearing rings are shaped non-circular.

5. A thrust ball bearing device comprising:

two members carrying out eccentric rotating movements therebetween, the two members having attaching portions opposite to each other in the axial direction;

a thrust ball bearing having a pair of bearing rings fixed to the attaching portions of said two members, raceway surfaces formed on axially mutually opposite surfaces of the bearing rings, and balls disposed between the mutually opposite raceway surfaces of the bearing rings, wherein one of the groove curvatures of the mutually opposite raceway surfaces is different from the other.

6. A thrust ball bearing device as set forth in claim 5, wherein the groove curvature of one bearing ring is larger than the groove curvature of the other bearing ring.

7. A thrust ball bearing device as set forth in claim 5, wherein the pair of bearing rings are the same shape, said each bearing ring having raceway surface of larger groove curvature and raceway surface of smaller groove curvature, and wherein one of the groove curvatures of the mutually opposite raceway surfaces is different from the other by a difference of position between the bearing rings in the circumferential direction.

8. A thrust ball bearing device as set forth in claim 5, 6 or 7, wherein an inner circumference or an outer circumference of at least one of said bearing rings is fitted to the corresponding attaching portion with a non-circular fitting, or an inner circumference and an outer circumference of at least one of said bearing rings are fitted to the corresponding attaching portions with non-circular fittings.

* * * * *